(12) United States Patent
Engel et al.

(10) Patent No.: US 9,825,532 B2
(45) Date of Patent: Nov. 21, 2017

(54) CURRENT CONTROL FOR DC-DC CONVERTERS

(71) Applicants: Stefan Engel, Aachen (DE); Ir. Rik W. A. A. De Doncker, Leuven (BE)

(72) Inventors: Stefan Engel, Aachen (DE); Ir. Rik W. A. A. De Doncker, Leuven (BE)

(73) Assignee: FLEXIBLE ELEKTRISCHE NETZE FEN GMBH (DE)

( * ) Notice: Subject to any disclaimer, the term of this patent is extended or adjusted under 35 U.S.C. 154(b) by 208 days.

(21) Appl. No.: 14/380,304

(22) PCT Filed: Mar. 14, 2013

(86) PCT No.: PCT/EP2013/055230
§ 371 (c)(1),
(2) Date: Dec. 4, 2014

(87) PCT Pub. No.: WO2013/135811
PCT Pub. Date: Sep. 19, 2013

(65) Prior Publication Data
US 2015/0146455 A1    May 28, 2015

(30) Foreign Application Priority Data
Mar. 14, 2012    (DE) .................. 10 2012 204 035

(51) Int. Cl.
*H02M 3/335* (2006.01)
*H02M 1/14* (2006.01)
*H02M 1/44* (2007.01)

(52) U.S. Cl.
CPC ..... *H02M 3/33507* (2013.01); *H02M 3/33584* (2013.01); *H02M 1/14* (2013.01); *H02M 1/44* (2013.01)

(58) Field of Classification Search
CPC ............. H02M 3/335; H02M 3/33507; H02M 3/33523; H02M 3/33569; H02M 3/33576; H02M 3/33584; H02M 3/33592
See application file for complete search history.

(56) References Cited

U.S. PATENT DOCUMENTS

| 5,027,264 A | 6/1991 | Dedoncker et al. |
| 6,370,050 B1 * | 4/2002 | Peng ................. H02M 3/33576 363/17 |

(Continued)

OTHER PUBLICATIONS

International Search Report for corresponding PCT/EP2013/055230, dated Feb. 27, 2014 by R. van Wesenbeck of the EPO.

*Primary Examiner* — Gary L Laxton
(74) *Attorney, Agent, or Firm* — Tarolli, Sundheim, Covell & Tummino LLP (57) ABSTRACT

A DC-DC converter having a primary side comprising at least three actively switched primary voltage bridges with several active switches for converting a DC input voltage into primary alternating voltages for each of the primary voltage bridges, and having a secondary side comprising at least three actively switched secondary voltage bridges with several active switches for converting the secondary alternating voltages into a shared DC output voltage for each of the secondary voltage bridges. The primary and secondary alternating voltages are each shifted by a phase angle φ with the periods T, and each of the primary and secondary voltage bridges is coupled to an appertaining phase via one or more transformers.

16 Claims, 7 Drawing Sheets

(56) References Cited

U.S. PATENT DOCUMENTS

| | | | |
|---|---|---|---|
| 8,587,975 B2 * | 11/2013 | Jain | H02M 3/33584 363/17 |
| 2012/0153729 A1 * | 6/2012 | Song | H02J 7/0013 307/82 |

* cited by examiner

CURRENT CONTROL FOR DC-DC CONVERTERS

RELATED APPLICATIONS

The present invention is a U.S. National Stage under 35 USC 371 patent application, claiming priority to Serial No. PCT/EP2013/055230, filed on 14 Mar. 2013; which claims priority from DE 102012204035.8, filed 14 Mar. 2012, the entirety of both of which are incorporated herein by reference.

TECHNICAL FIELD OF THE INVENTION

The invention relates to DC-DC converters having a so-called dual active bridge (DAB) topology as well as to a method for operating these DC-DC converters.

STATE OF THE ART

A DC-DC converter, also known as a power converter, refers to an electric circuit that converts a direct current fed in at the input into a direct current having a higher, lower or inverted voltage level. DC-DC converters can be found, for example, in the switched-mode power supply units of PC power supply packs, notebooks, mobile phones, small motors and HiFi devices. Their advantages in comparison to linear power supply units are their better efficiency and lower heat generation. In a linear voltage regulator or in a series resistor, in contrast, the superfluous voltage simply "burns out".

DC-DC converters are also available as completely encapsulated converter modules that are sometimes intended for direct insertion into printed circuit boards. The output voltage (secondary voltage) can be lower than, equal to or greater than the input voltage (primary voltage), depending on the model. The best-known modules are the ones that transform an extra-low voltage into a galvanically isolated extra-low voltage. The encapsulated DC-DC converters are available, for example, for insulation voltages ranging from 1.5 kV to over 3 kV, and they serve to supply power to small consumers in direct-voltage networks such as, for example, 24 V in industrial installations or 48 V in telecommunications or in the realm of electronic modules such as, for instance, 5 V for digital circuits or ±15 V for the operation of operational amplifiers. DC-DC converters are classified according to various criteria and divided into different topologies (type of structure of a branched network on current paths). In contrast to unidirectional converters, when it comes to bidirectional DC-DC converters, it is immaterial which terminal is defined as the input and which terminal is defined as the output. A bidirectional energy flow allows power to flow from the defined input (primary side) towards the output (secondary side) and vice versa.

In DC-DC converters that are based on the functional principle of a dual active bridge (DAB) topology, the DC input voltage is converted in an input converter into an AC voltage which is then fed to a transformer. The output of the transformer is connected to an output converter that once again converts the AC voltage into a DC output voltage for a load. These DC-DC converters can be implemented in single-phase or multi-phase configurations. Such DAB DC-DC converter topologies as disclosed, for example, in U.S. Pat. No. 5,027,264, constitute high-efficiency converter topologies that allow a bidirectional energy flow, galvanic separation via the transformer and operation at high voltages. This type of converter is particularly well-suited for use in medium-voltage DC networks.

In the case of a DC-DC converter with dual active bridge (DAB) topology, the transferred power is set by varying the phase angle between the voltage on the primary side and the voltage on the secondary side. If the transferred power is to be changed abruptly, undesired oscillations as well as an unbalanced distribution of the currents in the phases occur. The oscillation dies down as a function of the time constant L/R, wherein L stands for the sum of the leakage inductance of the primary winding and the leakage inductance of the secondary winding of the transformer—relative to the primary side—and R stands for the sum of the resistance of the primary winding and the resistance of the secondary winding—relative to the primary side. Therefore, it would be desirable for the oscillations to die down quickly, which would presuppose a small time constant L/R. In contrast, the oscillations in windings having an elevated leakage inductance and/or low ohmic losses would only die down slowly. A high leakage inductance, however, is of great significance precisely when it comes to the use of this converter within a broad voltage range between primary and secondary voltages. Conversely, a small resistance R is desirable in order to create such a converter having low ohmic losses and a high efficiency and thus a higher level of effectiveness. Owing to these boundary conditions, the oscillations that occur after a power change have a long time constant. For this reason, the phase angle of conventional DAB DC-DC converters is normally only changed slowly in order to avoid oscillations to the greatest extent possible. The slow change of the phase angle, however, leads to reduced dynamics of the current regulation, so that only a slow regulation of the current would be possible. Therefore, when it comes to DAB DC-DC converters that are supposed to have high dynamics, this method of oscillation reduction cannot be employed, thereby resulting in undesired oscillations and an unbalanced distribution of the currents in the phases.

SUMMARY OF THE INVENTION

It is an objective of the present invention to put forward a DAB DC-DC converter that allows a fast regulation of the current while, at the same time, minimizing oscillations in the direct current in case of power changes.

This objective is achieved by a method for operating an at least three-phase DC-DC converter having a primary side comprising at least three actively switched primary voltage bridges with several active switches for converting a DC input voltage into primary alternating voltages for each of the primary voltage bridges, and having a secondary side comprising at least three actively switched secondary voltage bridges with several active switches for converting the secondary alternating voltages into a shared DC output voltage for each of the secondary voltage bridges, whereby each of the primary voltage bridges is coupled to one of the secondary voltage bridges via a multi-phase transformer, or via particular a transformer to particular one phase, whereby the primary and secondary alternating voltages are shifted by a phase angle $\phi$ with a period T, said method comprising the steps of setting the phase angle $\phi$ from a first phase angle $\phi 1$ to a second phase angle $\phi 2$ as the switching operation for transferring power from the primary side to the secondary side, whereby the primary and secondary voltage bridges are switched during the switching operation in such a way that the phase angles $\phi$ of the individual phases are set independently of each other during the switching operation. By means of the above-mentioned DC-DC converter, a DAB DC-DC converter is provided that allows a fast change of the phase angle while, at the same time, minimizing or preventing oscillations in the direct current in the case of power changes. If oscillations in the direct current were not minimized or prevented, then the phase angle could only be changed very slowly. Thanks to the time-independent setting of the phase angle φ for the individual phases during the switching operation, the present invention allows a fast change of the phase angle, thus permitting a highly dynamic setting of the direct current (fast regulation of the current) and thus a fast power transfer. The method according to the invention precisely allows a highly dynamic change of the transferred power in contrast to the state of the art, where DAB DC-DC converters are employed in stationary operation. Moreover, thanks to the method according to the invention, unbalances in the phase currents can be avoided. For this purpose, in one embodiment, the phase angle φ of the various phases is set during the switching operation, independently of falling and rising edges of the primary and secondary alternating voltages. Therefore, the DC-DC converters according to the invention are especially well-suited as power converters, especially as DC-DC converters, to be used for medium to high power levels and so-called pulsed-power applications that entail high requirements of the dynamics.

The primary side refers to the part of the DC-DC converter that is facing the source of energy. In a corresponding manner, the secondary side refers to the other side of the transformer that is connected to the electric load. Here, the primary and secondary sides are insulated from each other by the transformer. If the DAB DC-DC converter is configured so as to be bidirectional, then the primary side in one bidirectional DC-DC converter can, in fact, be the secondary side in another bidirectional DC-DC converter. The DC-DC converter according to the present invention can be configured as a three-phase or multiphase DAB DC-DC converter, for instance, also as a five-phase DAB DC-DC converter.

The DC input voltage is present at the voltage bridges with the active switches and it is converted into an alternating voltage in the voltage bridges by switching the active switches (switching operation). Since, as a rule, the switches are completely switched on, alternating voltages that have approximately the shape of a square-wave (square-wave voltage) are formed at the output bridges. As a result, the voltage over the transformer windings becomes stepped. If applicable, owing to the use of so-called snubbers, the edges of the square-wave voltage are not infinitely steep, that is to say, the form deviates from that of a square-wave voltage (stepped form at the transformer windings). Snubbers are employed to ensure a dynamic voltage balancing in switching operations (snubber network). The term "snubber network" refers to an electric circuit having snubber elements that, in the case of an abrupt interruption of the current flow, are meant to neutralize, for example, interfering high frequencies or voltage peaks that usually occur when inductive loads are switched. Snubber elements limit the rate of voltage rise or the rate of current rise on semiconductors.

Depending on the configuration, two or more active switches per voltage bridge can be employed. Suitable switches for the voltage bridges are active semiconductors (power semiconductors) such as, for example, gate turn-off thyristors, transistors, MOSFETs, IGBTs (insulated gate bipolar transistors) or ICGTs (integrated gate-commuted thyristor) with intelligent gate drivers. As an alternative, the person skilled in the art can also employ other suitable active switches.

The term "transformer" as set forth here refers to the magnetic circuit—usually a ferrite or iron core—with the appertaining windings of the primary and secondary voltage bridges around the magnetic core. If each of the phases comprises a separate transformer, only the conductors of a primary phase and the appertaining other secondary phase are wound around the transformer that is associated with this phase. The magnetic cores of the transformers of the individual phases are then physically separated from each other. The term "multiphase transformer", in contrast, refers to a transformer that has a shared magnetic core for all phases, whereby the windings of the primary and secondary voltage bridges of the individual phases are arranged in different areas of the magnetic core. In one embodiment of a three-phase DC-DC converter according to the present invention, the multiphase transformer is a three-phase transformer. The function of a DAB DC-DC voltage converter, in both cases, is to bring about a systematic voltage drop via the AC voltages on the transformer via the leakage inductance of the transformer and thus to control the power flow. Actively switched voltage bridges make it possible to independently control the shift angle (phase angle) between the primary and secondary alternating voltages present on the transformer and thus to systematically control the power flow.

The phase angle φ here refers to the shift of the primary and secondary alternating voltages with respect to each other, each with the period T. The first phase angle φ1 refers to the shift of the primary and secondary alternating voltages with respect to each other before the beginning of a switching operation. The second phase angle φ2 refers to the shift of the primary and secondary alternating voltages with respect to each other after the end of the switching operation. During the switching operation, the phase angles φ can also assume one or more values between φ1 and φ2, whereby φ1 can be greater or smaller than φ2. In this context, the phase angle φ can assume positive and negative values. A positive value φ between a first and a second alternating voltage means that the second alternating voltage lags behind the first alternating voltage in the characteristic curve of the alternating voltages. Correspondingly, a negative value φ between a first and a second alternating voltage means that the second alternating voltage leads (or precedes) the first alternating voltage in the characteristic curve of the alternating voltages.

In one embodiment, the phase angles φ of the individual phases are set differently in order to balance the currents in the phases. The method is not restricted to the use of the same phase angles for all phases. As a result, for instance, unbalances of the transformers can be balanced in such a way that there is nevertheless a balanced current distribution in the phases.

In another embodiment, the DC-DC converter is a three-phase DC-DC converter with three actively switched primary voltage bridges, each having two or more active switches, and three actively switched secondary voltage bridges, each having two or more active switches, whereby, the switching operation effects the setting of the phase angle φ2 of all three phases at the same edges (that is to say, either only for the rising edges of the alternating voltages of the phases or else only for the falling edges of the alternating voltages of the phases) of the primary and secondary alternating voltages at the primary and secondary voltage bridges. Such a three-phase DC-DC converter with DAB topology has the advantage, for instance, that it significantly increases the available power density due to the improved utilization of the available apparent power of the transformer. In one embodiment, the number of switches can amount to two switches per voltage bridge. In other embodiments, for example, four switches per voltage bridge can also be employed, as is the case for an NPC topology. In one embodiment, the DC-DC converter according to the present invention is a three-phase DAB NPC DC-DC converter. NPC stands for neutral-point clamped. In three-phase DAB NPC DC-DC converters, the voltage levels can be set via clamping diodes so as to be balanced, as a result of which the medium voltage matches the zero voltage level, without this calling for balancing networks and/or drivers. In alternative embodiments, instead of the clamping diodes, it is possible to use IGBTs (bipolar transistors with an insulated gate electrode) (ANPC inverters), or else capacitors in so-called FLCs for purposes of distributing the voltage.

In a preferred embodiment of the method for a three-phase DC-DC converter, said method comprises the following additional steps:

first switching of the primary/secondary alternating voltage of the second primary/secondary voltage bridge at the point in time t0, and first switching of the secondary/primary alternating voltage of the second secondary/primary voltage bridges, shifted by the phase angle ϕ2, first switching of the primary/secondary alternating voltage of the first primary/secondary voltage bridge at the point in time t0+T/6, and first switching of the secondary/primary alternating voltage of the first secondary/primary voltage bridge, shifted by the phase angle ϕ1, first switching of the primary/secondary alternating voltage of the third primary/secondary voltage bridge at the point in time t0+T/3, and first switching of the secondary/primary alternating voltage of the third secondary/primary voltage bridge, shifted by the phase angle ϕ2, second switching of the primary/secondary alternating voltage of the second primary/secondary voltage bridge at the point in time t0+T/2, and second switching of the secondary/primary alternating voltage of the second secondary/secondary voltage bridge, shifted by the phase angle ϕ2, second switching of the primary/secondary alternating voltage of the first primary/secondary voltage bridge at the point in time t0+2/3*T, and second switching of the secondary/primary alternating voltage of the first secondary/primary voltage bridge, shifted by the phase angle ϕ2, second switching of the primary/secondary alternating voltage of the third primary/secondary voltage bridge at the point in time t0+5/6*T, and second switching of the secondary/primary alternating voltage of the third secondary/primary voltage bridge, shifted by the phase angle ϕ2.

This method additionally avoids an unbalance of the phase currents. The target current here is already reached after T/3, without excitation of oscillations. If the plus/minus sign of the phase angle also changes when the phase angle changes, an elevated phase current nevertheless occurs briefly after the change of the phase angle. In this context, the method can be applied to phase shifts of 120° between the voltages of the first, second and third primary voltage bridges, or of the first, second and third secondary voltage bridges, although the method is not restricted to phase shifts of 120°. By the same token, the method is not restricted to the above-mentioned sequence of switching operations of the individual bridges. The method can also be used for a cyclical interchange of the switching operations, or for a reversal of the switching operations. The terms "primary/secondary" or "secondary/primary" refer to the appertaining switching operations for the sides cited either before or after the slash "/". Here, the first items (before the slash) correspond to the switching operations for a current flow in the one direction, whereas the second items (after the slash) correspond to the switching operations for the reversed current flow. This method also allows a fast change of the power flow as well as a balanced current distribution in the three phases. If the primary and secondary alternating voltages are shifted by a positive phase angle, then the secondary alternating voltage switches to the primary alternating voltage so as to be lagging. In contrast, if the primary and secondary alternating voltages are shifted by a negative phase angle, then the secondary alternating voltage switches to the primary alternating voltage so as to be leading (or preceding). Both possibilities are encompassed by the above-mentioned method.

In another alternative embodiment, the phase angles ϕ are different for rising and falling edges. In a preferred embodiment, the DC-DC converter is a three-phase DC-DC converter with three actively switched primary voltage bridges, each having two or more active switches, and three actively switched secondary voltage bridges, each having two or more active switches, whereby the switching operation comprises three successive switching operations of the primary and secondary alternating voltages of the voltage bridges of the appertaining three phases by the phase angle ϕ=(ϕ1−ϕ2)/2. In one embodiment, the number of switches can be two switches per voltage bridge. In other embodiments, for example, four switches can also be employed per voltage bridge as is the case with an NPC topology. In one embodiment, the DC-DC converter according to the present invention is a three-phase DAB NPC DC-DC converter. NPC stands for neutral-point clamped. In three-phase DAB NPC DC-DC converters, the three voltage levels can be set via clamping diodes so as to be balanced, as a result of which the medium voltage matches the zero voltage level, without this calling for balancing networks and/or drivers. In alternative embodiments, instead of the clamping diodes, it is possible to use IGBTs (bipolar transistors with an insulated gate electrode) (ANPC inverters), or else capacitors in so-called FLCs for purposes of distributing the voltage. In a preferred embodiment, the method comprises the following additional steps:

first switching of the primary/secondary alternating voltage of the second primary/secondary voltage bridge at the point in time t0, and first switching of the secondary/primary alternating voltage of the second secondary/primary voltage bridge, shifted by the phase angle ϕ=(ϕ1−ϕ2)/2, first switching of the primary/secondary alternating voltage of the first primary/secondary voltage bridge at the point in time t0+T/6, and first switching of the secondary/primary alternating voltage of the first secondary/primary voltage bridge, shifted by the phase angle ϕ=(ϕ1−ϕ2)/2, first switching of the primary/secondary alternating voltage of the third primary/secondary voltage bridge at the point in time t0+T/3, and first switching of the secondary/primary alternating voltage of the third secondary/primary voltage bridge, shifted by the phase angle ϕ=(ϕ1−ϕ2)/2, repeating the above-mentioned steps, as particular second switching of the primary/secondary alternating voltage and as a second switching of the secondary/primary alternating voltage of the first, second and third primary/secondary voltage bridges, shifted by the phase angle ϕ2.

This alternative method likewise additionally avoids an unbalance of the phase currents. The target current here is already reached after T/2. This method is characterized in that no oscillations are excited and in that no elevated phase current occurs, not even briefly after the change of the phase angle. In other words, in comparison to the preceding alternative method, this method reaches the target current later (T/2 instead of T/3), but in this case, without a slightly elevated phase current for a brief period of time, even if the plus/minus sign of the phase angle changes. The method can be employed for phase shifts of 120° between the voltages of the first, second and third primary voltage bridges, or of the first, second and third secondary voltage bridges, although the method is likewise not restricted to phase shifts of 120°. By the same token, the method is not restricted to the above-mentioned sequence of switching operations of the individual bridges. The method can also be used for a cyclical interchange of the switching operations, or for a reversal of the switching operations. The terms "primary/secondary" or "secondary/primary" refer to the appertaining switching operations for the sides cited either before or after the slash "/". Here, the first items (before the slash) correspond to the switching operations for a current flow in the one direction, whereas the second items (after the slash) correspond to the switching operations for the reversed current flow. This method also allows a fast change of the power flow as well as a balanced current distribution in the three phases. If the primary and secondary alternating voltages are shifted by a positive phase angle, then the secondary alternating voltage switches to the primary alternating voltage so as to be lagging. If, in contrast, the primary and secondary alternating voltages are shifted by a negative phase angle, then the secondary alternating voltage switches to the primary alternating voltage so as to be leading (or preceding). Both possibilities are encompassed by the above-mentioned method.

In another embodiment, the switching operation for setting the second phase angle φ2 comprises one or more periods T of the primary and secondary alternating voltages, and the phase angle φ between the primary and secondary alternating voltages is set stepwise to the second phase angle φ2 on the edge. In a preferred embodiment, the stepwise setting of the phase angle φ2 is done linearly in steps of the same size. This makes it easier to suppress possible slightly elevated phase currents. This method is advantageous if the current is supposed to be changed linearly within a period of time that is greater than T/2.

In another embodiment, the phase angles φ of the rising and falling edges are adapted during the switching operation on the basis of the above-mentioned phase angles in order to compensate for transformer and switch influences. This makes it possible to compensate for influences that cannot already be avoided just by the topology.

In another embodiment, the DC-DC converter is operated in such a way that the phase shifts of the primary alternating voltages of the primary voltage bridges among each other as well as the phase shifts of the secondary alternating voltages of the secondary voltage bridges among each other deviate from 120°. In this manner, the above-mentioned advantages to be retained while, at the same time, unbalances of the transformer can be balanced.

The invention also relates to a system consisting of an at least three-phase DC-DC converter having a primary side comprising at least three actively switched primary voltage bridges with several active switches for converting a DC input voltage into primary alternating voltages for each of the primary voltage bridges, and having a secondary side comprising at least three actively switched secondary voltage bridges with several active switches for converting the secondary alternating voltages into a shared DC output voltage for each of the secondary voltage bridges, whereby each of the primary voltage bridges is coupled to one of the secondary voltage bridges via a multi-phase transformer, or via particular a transformer to particular one phase, in order to transform the primary alternating voltage into the secondary alternating voltage, whereby the primary and secondary alternating voltages are shifted by a phase angle φ with a period T, said system consisting of at least one control unit that is configured to carry out the control of the active switches of the primary and secondary voltage bridges of the at least three-phase DC-DC converter by means of the method according to the present invention. In this context, the control unit according to the present invention could be configured as a control means that makes use of one or more DSPs (digital signal processor), FPGAs (so-called field programmable gate arrays), CLPDs (so-called complex programmable logic devices), a microcontroller or else making use of a combination of the above-mentioned components.

In one embodiment of the system, the DC-DC converter is a three-phase DC-DC converter with three actively switched primary voltage bridges, each having two or more active switches, and three actively switched secondary voltage bridges, each having two or more switches.

Furthermore, the DC-DC converter can have a low-pass filter on the primary side and/or on the primary [sic] side. By the same token, one or more capacitors can be arranged on the primary side and/or on the secondary side in order to filter the current. The method according to the invention can also be applied to the DAB DC-DC converter topology with capacitors that are connected in series or in parallel to the transformer windings (or in a different arrangement), for instance, for resonance converters or resonant DAB converters.

BRIEF DESCRIPTION OF THE DRAWINGS

These and other aspects of the present invention are presented in detail in the drawings.

FIG. 1: (a) shows an embodiment of a topology of a DC-DC converter (DAB DC-DC converter) that is suitable for carrying out the method according to the invention, and (b) shows the same topology while illustrating the particular transformer for each phase;

DETAILED DESCRIPTION OF EMBODIMENTS

Figure 1:
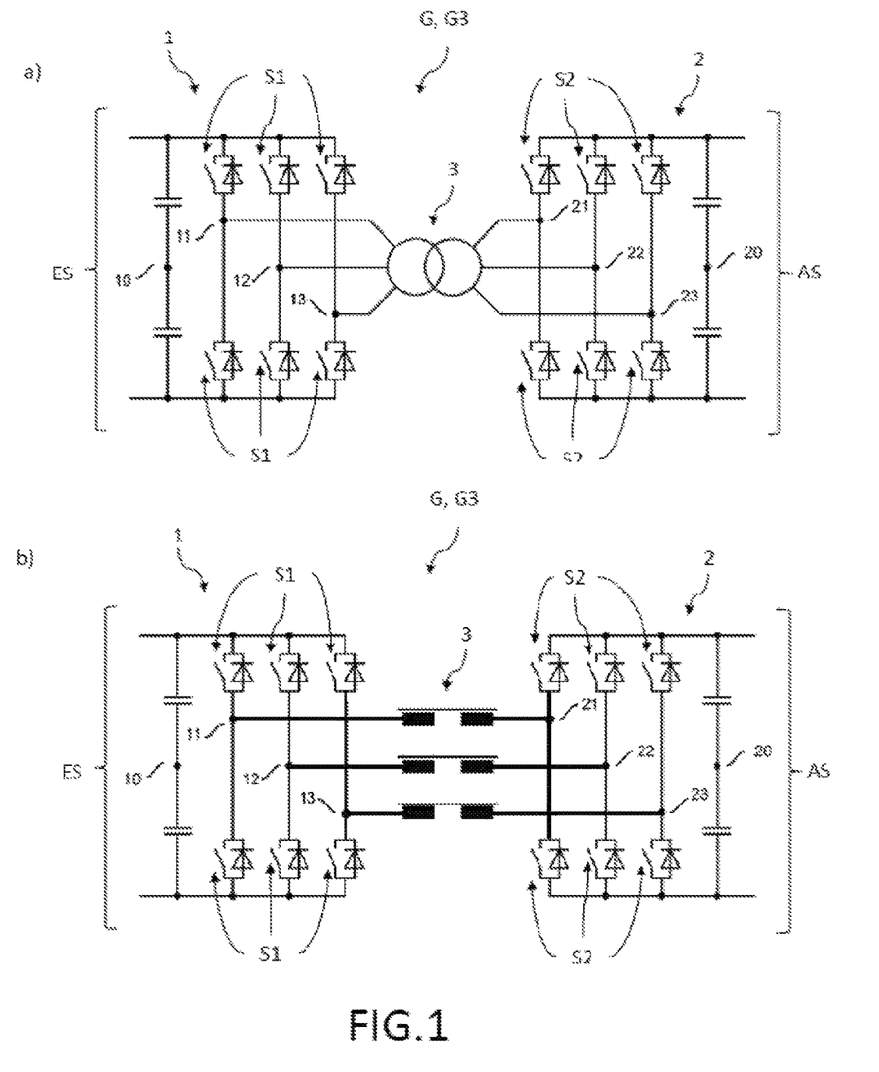

As an embodiment of the DC-DC converter, FIG. 1 shows a three-phase DC-DC converter G3 with a primary side 1 comprising three actively switched primary voltage bridges 11, 12, 13, each having two active switches S1 for converting a DC input voltage ES into primary alternating voltages 111, 112, 113 for each of the primary voltage bridges 11, 12, 13, and with a secondary side 2 comprising three actively switched secondary voltage bridges 21, 22, 23, each having two active switches S2 for converting the secondary alternating voltages 211, 212, 213 into a shared DC output voltage AS for each of the secondary voltage bridges 21, 22, 23. Examples of suitable switches S1, S2 for the voltage bridges are active semiconductor switches (power semiconductors) such, for instance, gate turn-off thyristors, transistors, MOSFETs, IGBTs (insulated gate bipolar transistors) or ICGTs (integrated gate-commuted thyristors) with intelligent gate drivers. In other embodiments, the number of voltage bridges and/or the number of active switches S1, S2 per voltage bridge can vary; for example, in an NPC topology, this can be four switches per voltage bridge. Each of the primary voltage bridges 11, 12, 13 is coupled to one of the secondary voltage bridges 21, 22, 23 via a multiphase transformer 3, for instance, a three-phase transformer 3, in this case the three-phase DC-DC converter G3, or else via a separate transformer 3 to each of the phases, whereby the alternating voltages 111, 112, 113, 211, 212, 213 applied on the primary and secondary sides are shifted by a phase angle φ with a period T. (a) in FIG. 1 illustrates multiphase transformer 3 while (b) in FIG. 1 illustrates three-phase transformer 3 as consisting of the aforementioned separate transformers for each phase. For purposes of the load transfer, the phase angle is switched from a first phase angle φ1 to a second phase angle φ2 during the switching operation. In this embodiment, capacitors 10, 20 are arranged on the primary and secondary sides in order to filter the voltage. In other embodiments, it is possible to dispense with the capacitors or else the capacitors can be replaced or augmented by low-pass filters. The topology of the DC-DC converter shown here in the form of DAB DC-DC converters can be used for the switching method according to the state of the art as well as for the switching method according to the invention. However, in other embodiments, the DC-DC converter can also have more than three phases. The control unit that serves to control the switches is not shown here.

Figure 2:
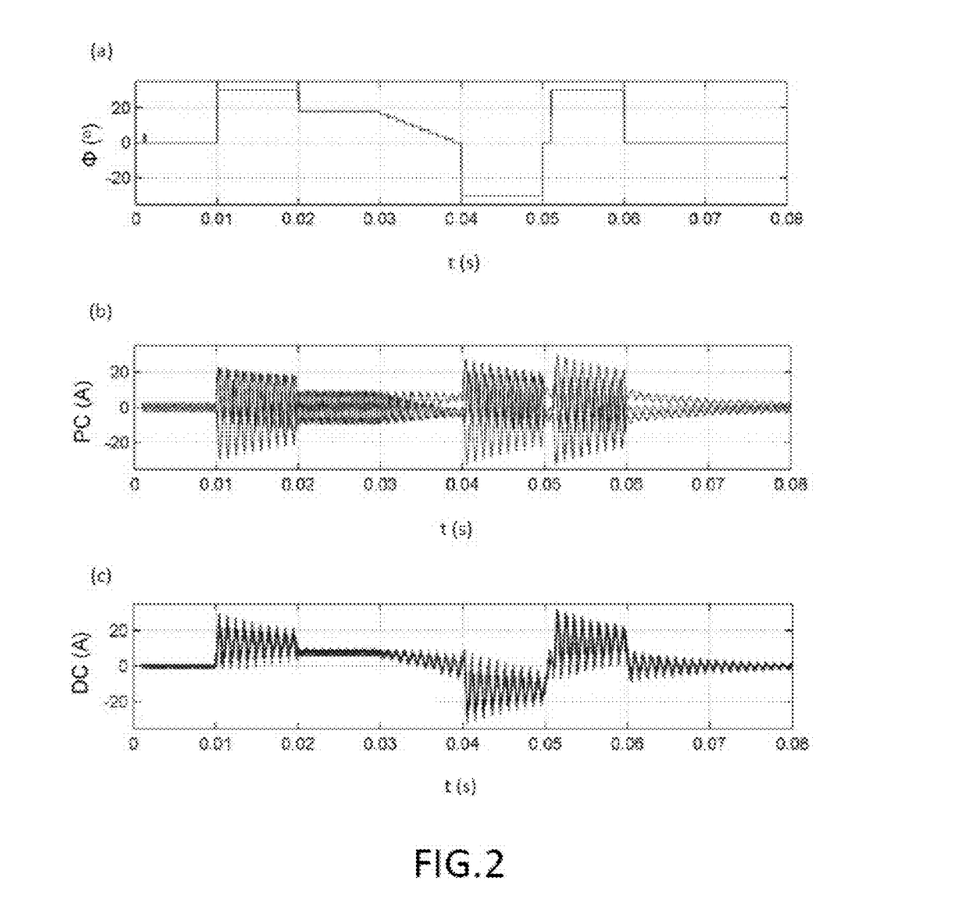
FIG. 2: shows simulated curves of (a) the phase angle, (b) the phase current, and (c) the direct current for a DC-DC converter shown in FIG. 1, with a switching method according to the state of the art, with oscillations.

FIG. 2 shows the simulated curves of (a) the phase angle in degrees, (b) the phase current in amperes, and (c) the direct current in amperes, for a three-phase DC-DC converter shown in FIG. 1, with a switching method according to the state of the art, which causes oscillations in the direct current if the phase angle is changed quickly. A fast change of the phase angle allows power to be transferred rapidly. The simulations were carried out for alternating voltages in the form of square-wave voltages having a frequency of 1 kHz, a transformation ratio of 1:1, primary and secondary leakage inductances of 1 mH in each case, and primary and secondary winding resistances of 100 mΩ in each case, a main inductance of 100 mH in the transformer, a primary voltage of 500 V, a secondary voltage of 550 V, and under the assumption of ideal switches (R=0 Ω when the switch is closed and R=∞ when the switch is open) as the switches S1, S2. The same values and assumptions were employed for the simulations for the phase angle, the phase current and the direct current of the method according to the invention shown in FIGS. 3 and 5, and depicted in FIGS. 4 and 6, so that the methods shown could be compared (state of the art in comparison to the method according to the invention). The switching method according to the state of the art does not change the angle φ of the three phases independently of each other, but rather, in one shared step for all phases, as shown in FIG. 2(a), so that strong oscillations of the direct current occur after each change of the phase angle φ. In order to display the oscillations that occur in the case of a switching method according to the state of the art, the DC input current is shown by way of an example for the direct current, although, qualitatively speaking, the same behavior occurs for the DC output current as well. With each change in the value of the phase angle φ (see FIG. 2(a)), strong oscillations having a large amplitude occur for the phase current (see FIG. 2(b)) in the voltage bridges and for the direct current (see FIG. 2(c)) on the input side, which reach their highest values at the greatest changes in the phase angle φ; in this context, see the switching operations at the points in time 0.1 s, 0.04 s and 0.05 s. As can be seen in FIGS. 2(b) and (c), the oscillations die down with a long time constant. The time constant is proportional to L/R, wherein L stands for the sum of the leakage inductance of the primary winding and the leakage inductance of the secondary winding of the transformer—relative to the primary side—and R stands for the sum of the resistance of the primary winding and the resistance of the secondary winding—relative to the primary side. A high leakage inductance, however, is of great significance precisely when it comes to the use of this DAB DC-DC converter within a broad voltage range between primary and secondary voltages. In contrast, a small resistance R is desirable in order create such a DAB DC-DC converter having few ohmic losses and a high efficiency and thus a higher effectiveness. Owing to these boundary conditions, the oscillations that occur after a power change have a long time constant. The oscillations of the direct current are suppressed according to the state of the art in that the phase angle φ is only changed slowly, which is simulated here as a stepwise change in many small steps within the time interval of 0.03 s to 0.04 s, see FIG. 2(a). Correspondingly, the oscillations in the direct current that occur (see FIG. 2(c)) are markedly smaller than in the case of an abrupt change in a single step.

Figure 3:
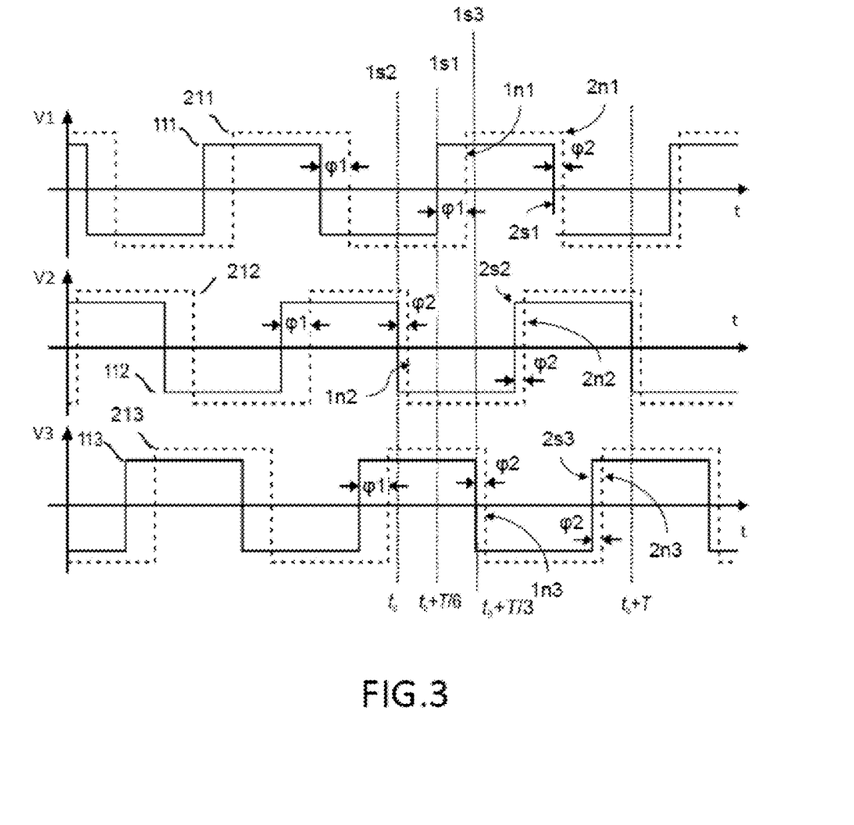
FIG. 3: shows a first embodiment of the method according to the invention, for a three-phase DAB DC-DC converter.

FIG. 3 shows a first embodiment of the method according to the invention for a three-phase DAB DC-DC converter by means of which the oscillations, as shown before in FIG. 2(c), can be prevented. Here, the primary alternating voltages 111, 112, 113 (solid lines) and the secondary alternating voltages 211, 212, 213 (broken lines) according to the simulations for FIGS. 2, 4 and 6 are depicted as square-wave voltages. The DC input voltage is present at the voltage bridges 11, 12, 13 with the active switches and it is converted into an alternating voltage 111, 112, 113 in the voltage bridges 11, 12, 13 in that the active switches S1 are switched (switching operation), and then this DC input voltage is transformed into a corresponding alternating voltage 211, 212, 213 by means of the transformer 3. Since, as a rule, the switches S1 are completely switched on, alternating voltages 211, 212, 213 that have approximately the shape of a square-wave (square-wave voltage) are formed at the output bridges 21, 22, 23. As a result, the voltage over the transformer windings becomes stepped. If applicable, owing to the use of so-called snubbers, the edges of the square-wave voltage 111, 112, 113, 211, 212, 213 are not infinitely steep, that is to say, the form deviates from that of a square-wave voltage (stepped form at the transformer windings).

In FIG. 3, the primary and secondary alternating voltages 111, 112, 113, 211, 212, 213 are switched according to the invention by means of the switches S1, S2 in such a way that, during the switching operation, the switching (setting) of the phase angle φ2 for all three phases takes place for the same edges of the primary and secondary alternating voltages 111, 112, 113, 211, 212, 213 at the primary and secondary voltage bridges, here each time at the falling edges of the alternating voltages V1, V2 and V3, from φ1 to φ2, whereby the primary switching operation for the primary alternating voltages 111, 112, 113 takes place at the point in time t0 for the second phase, at the point in time t0+T/3 for the third phase and at the point in time t0+2/3 T for the first phase. In this embodiment, the switching operations for the secondary alternating voltages 211, 212, 213 take place so as to be lagging (shifted) by φ1 or φ2 relative to the switching operations of the primary alternating voltages, depending on the edge orientation relative to the edge of the first switching operation. The term "lagging" refers to a positive phase angle φ>0. Of course, the above-mentioned example of a switching method according to the invention can also be carried out for so-called leading phase angles φ. A leading phase angle corresponds to a negative phase angle φ<0. If the first switching operation takes place at a falling edge (t0, second phase V2), then the switching operations of the secondary alternating voltages 211, 213 of the first and third phases take place so as to be lagging (shifted) by φ2 with respect to the switching of the corresponding primary alternating voltages 111, 113 at the next falling edges of the secondary alternating voltages 211, 213 of the first and third phases. At the preceding rising edges of the secondary alternating voltages 211, 213 of the first or third phases, in contrast, the switching operation takes place so as to still be lagging by φ1 with respect to the switching of the corresponding primary alternating voltages 111, 113.

In one embodiment, shown in FIG. 3, the first switching operation 1s2 of the primary (secondary) alternating voltage 112 (212) of the second primary (secondary) voltage bridge 12 (22) takes place at the point in time t0, and the first switching operation 1n2 of the secondary (primary) alternating voltage 212 (112) of the second secondary (primary) voltage bridges 22 (12) takes place so as to be lagging by a phase angle φ2>0. Subsequently, the first switching operation 1s1 of the primary (secondary) alternating voltage 111 (211) of the first primary (secondary) voltage bridge 11 (21) takes place at the point in time t0+T/6, and the first switching operation 1n1 of the secondary (primary) alternating voltage 211 (111) of the first secondary (primary) voltage bridge 21 (11) takes place so as to be lagging by the phase angle φ1>0, independently of the preceding switching operations. Subsequently, the first switching operation 1s3 of the primary (secondary) alternating voltage 113 (213) of the third primary (secondary) voltage bridge 13 (23) takes place at the point in time t0+T/3, and the first switching operation 1n3 of the secondary (primary) alternating voltage 213 (113) of the third secondary (primary) voltage bridge 23 (13) takes place so as to be lagging by a phase angle φ2>0, independently of the preceding switching operation. Subsequently, the second switching operation 2s2 of the primary (secondary) alternating voltage 112 (212) of the second primary (secondary) voltage bridge 12 (22) takes place at the point in time t0+T/2, and the second switching operation 2n2 of the secondary (primary) alternating voltage 212 (112) of the second secondary (secondary) voltage bridge 22 (12) takes place so as to be lagging by the phase angle φ2>0, independently of the preceding switching operations. Subsequently, the second switching operation 2s1 of the primary (secondary) alternating voltage 111 (211) of the first primary (secondary) voltage bridge 11 (21) takes place at the point in time t0+2/3*T, and the second switching operation 2n1 of the secondary (primary) alternating voltage 211 (111) of the first secondary (primary) voltage bridge 21 (11) takes place so as to be lagging by the phase angle φ2>0, independently of the preceding switching operations. Subsequently, the second switching operation 2s3 of the primary (secondary) alternating voltage 113 (213) of the third primary (secondary) voltage bridge 13 (23) takes place at the point in time t0+5/6*T, and the second switching operation 2n3 of the secondary (primary) alternating voltage 213 (113) of the third secondary (primary) voltage bridge 23 (13) takes place so as to be lagging by the phase angle φ2>0, independently of the preceding switching operations. As an alternative, the above-mentioned switching method can also be carried out with negative phase angles. In this case, the first or second switching operation of the secondary (primary) alternating voltages would take place so as to be leading (preceding) with respect to the switching of the primary (secondary) alternating voltage. The terms "primary" and "secondary" that are not between parentheses as well as the corresponding reference numerals refer to switching operations for a current flow in the one direction of the DC-DC converter. The reference numerals and terms "(primary)" and "(secondary)" that are between parentheses refer to the corresponding switching operations for the reverse current flow in the other direction of the DC-DC converter. This method also allows a fast reversal of the power flow as well as a balanced current distribution in the three phases.

Figure 4:
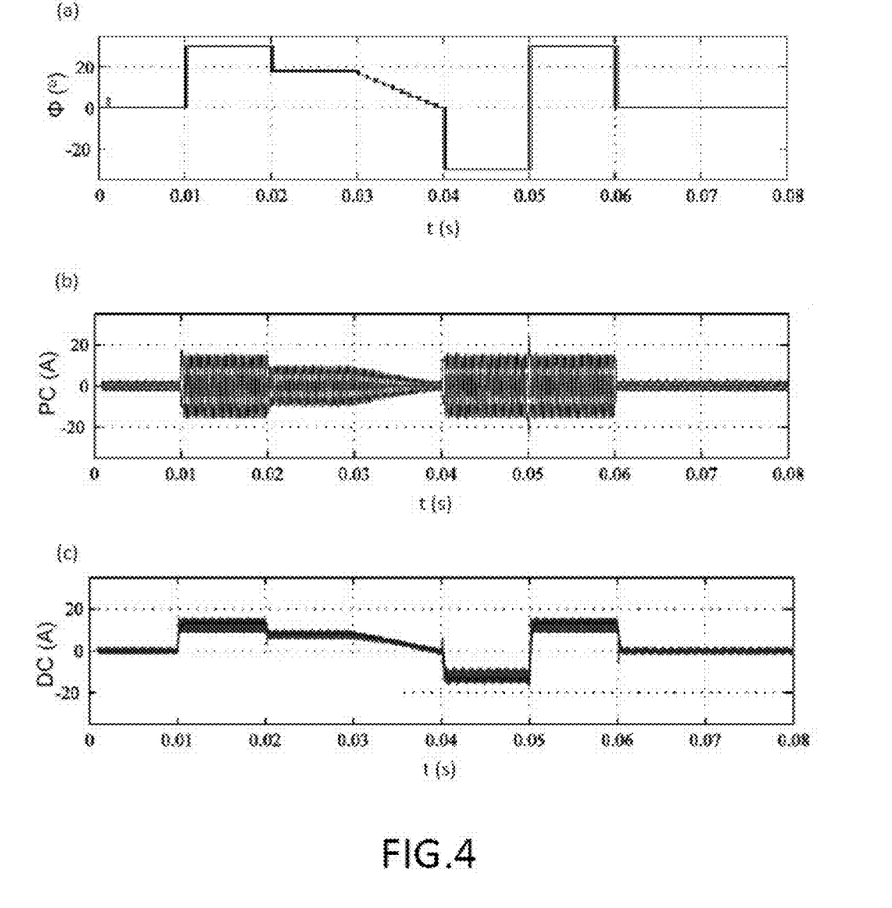
FIG. 4: shows simulated curves of (a) the phase angle, (b) the phase current, and (c) the direct current for a DC-DC converter shown in FIG. 1, with a switching method according to the invention by means of the first embodiment of the method shown in FIG. 3.

FIG. 4 shows the simulated curves of (a) the phase angle in degrees, (b) the phase current in amperes, and (c) the direct current in amperes, for a three-phase DC-DC converter shown in FIG. 1, which is operated with the switching method according to the invention as shown in FIG. 3 in order to quickly change the phase angle and in order to avoid oscillations in the direct current. By means of the above-mentioned switching method shown in FIG. 3, the phase current already reaches its target value after T/3, and the direct current in FIG. 4(c) does not show any of the oscillations which can be seen with a switching method according to the state of the art. During the switching operation from the phase angle φ1 to φ2, however, the phase current is briefly elevated, see FIG. 4(c), especially at the point in time t=0.05 s, in which the switching operation changes the plus/minus sign of the phase angle (large change). Corresponding slight elevations can also be seen in the direct current in FIG. 4(c) at the switching points in time t=0.01 s, 0.02 s, 0.04 s, 0.05 s and 0.06 s. The direct current shown in FIG. 4(c) is here, for example, the DC input current, although qualitatively speaking, the same behavior occurs as with the DC output current. A low-pass filter, for instance, a $1^{st}$ order low-pass filter with Ts=1/6 ms, on the primary side and secondary side of the DC-DC converter, can filter the direct current of the appertaining sides even further. By the same token, one or more capacitors can be arranged on the primary side and/or on the secondary side for smoothing purposes.

Figure 5:
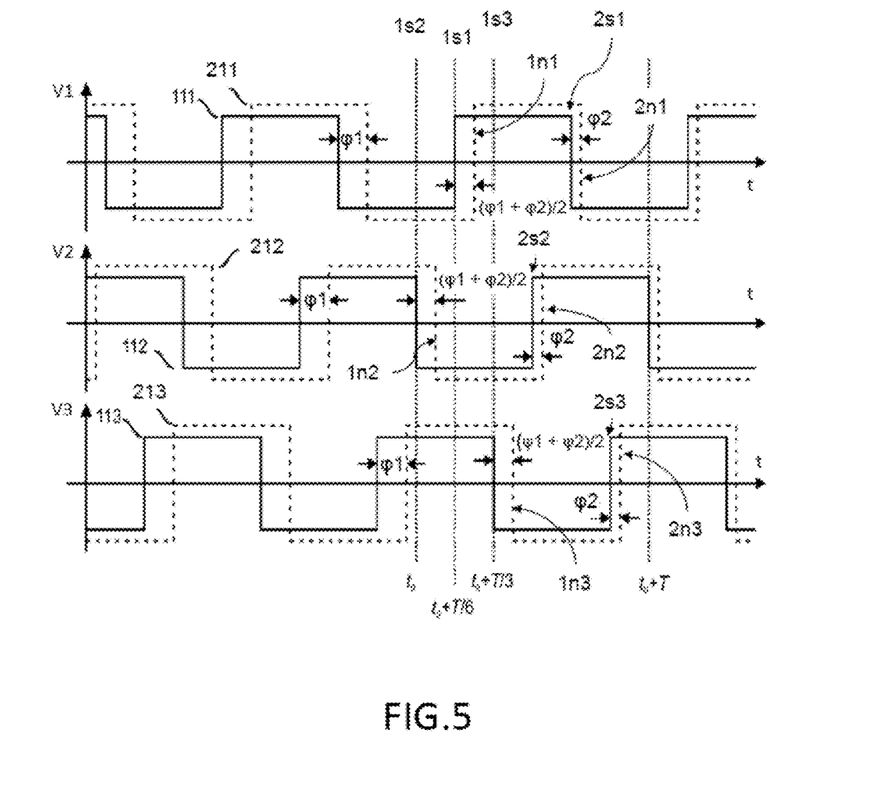
FIG. 5: shows a second embodiment of the method according to the invention, for a three-phase DAB DC-DC converter.

FIG. 5 shows a switching method according to the present invention, as an alternative to the switching method shown in FIG. 3. Here, the switching operation takes place by means of three successive switching operations of the primary and secondary alternating voltages 111, 112, 113, 211, 212, 213 of the voltage bridges 11, 12, 13, 21, 22, 23 of the appertaining three phases by the phase angle φ=(φ1+φ2)/2, whereby the primary switching operation for the primary alternating voltages 111, 112, 113 takes place at the points in time t0, t0+T/6, t0+T/3, t0=T/2, t0+2/3*T and t0+5/6*T. The switching operations for the secondary alternating voltages 211, 212, 213 take place with a change of the phase angle in two stages so as to each be shifted by ($\phi1+\phi2$)/2 alternately on falling and rising edges of the second, first and third phases—in the first switching operation so as to be lagging (shifted) by ($\phi1+\phi2$)/2 and in the second switching operation so as to be lagging (shifted) by $\phi2$.

Figure 6:
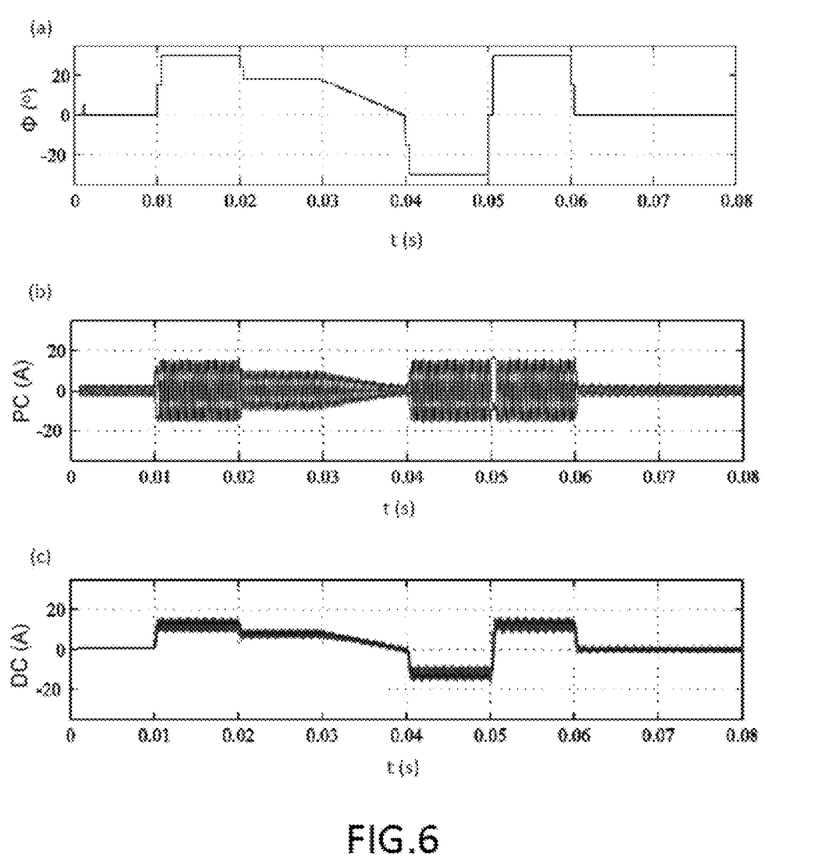
FIG. 6: shows the simulated curves of (a) the phase angle, (b) the phase current, and (c) the direct current for a DC-DC converter shown in FIG. 1, with a switching method according to the invention in the second embodiment of the method shown in FIG. 5.

Here, the primary alternating voltages 111, 112, 113 (solid lines) and the secondary alternating voltages 211, 212, 213 (broken lines) in accordance with the simulations are shown as square-wave voltages in FIGS. 2, 4 and 6. The DC input voltage is present at the voltage bridges 11, 12, 13 with the active switches and it is converted into an alternating voltage 111, 112, 113 in the voltage bridges 11, 12, 13 by switching the active switches S1 (switching operation), and connected via the transformer to a corresponding alternating voltage 211, 212, 213. Since, as a rule, the switches S1, S2 are completely switched on or off, alternating voltages 111, 112, 113, 211, 212, 213 that have approximately the shape of a square-wave (square-wave voltages) are formed at the output bridges 11, 12, 13, 21, 22, 23. As a result, the voltage over the transformer windings becomes stepped. If applicable, owing to the use of so-called snubbers, the edges of the square-wave voltage are not infinitely steep, that is to say, the form deviates from that of a square-wave voltage (stepped form at the transformer windings).

In the embodiment shown in FIG. 5, the first switching operation 1s2 of the primary (secondary) alternating voltage 112 (212) of the second primary (secondary) voltage bridge 12 (22) takes place at the point in time t0, and the first switching operation 1n2 of the secondary (primary) alternating voltage 212 (112) of the second secondary (primary) voltage bridges 22 (12) takes place so as to be lagging by a positive phase angle $\phi=(\phi1+\phi2)/2$. Subsequently, the first switching operation 1s1 of the primary (secondary) alternating voltage 111 (211) of the first primary (secondary) voltage bridge 11 (21) takes place at the point in time t0+T/6, and the first switching operation 1n1 of the secondary (primary) alternating voltage 211 (111) of the first secondary (primary) voltage bridge 21 (11) takes place so as to be lagging by the positive phase angle $\phi=(\phi1+\phi2)/2$, independently of the preceding switching operation. Subsequently, the first switching operation 1s3 of the primary (secondary) alternating voltage 113 (213) of the third primary (secondary) voltage bridge 13 (23) takes place at the point in time t0+T/3, and the first switching operation 1n3 of the secondary (primary) alternating voltage 213 (113) of the third secondary (primary) voltage bridge 23 (13) takes place so as to be lagging by the positive phase angle $\phi=(\phi1+\phi2)/2$, independently of the preceding switching operations. The above-mentioned steps are repeated in each case as a second switching operation 2s2, 2n2, 2s1, 2n1, 2s3, 2n3 of the primary (secondary) alternating current 111, 112, 113 (211, 212, 213) and as a second lagging switching operation of the secondary (primary) alternating voltage 211, 212, 213 (111, 112, 113) for the second, first and third primary and secondary voltage bridges 21, 22, 11, 12, 13, 23 in order to set the positive phase angle $\phi2$. As an alternative, the above-mentioned switching method can also be carried out with negative phase angles. In this case, the first or second switching operation of the secondary (primary) alternating voltages would take place so as to be leading (preceding) with respect to the switching of the primary (secondary) alternating voltage. The terms "primary" and "secondary" that are not between parentheses as well as the corresponding reference numerals refer to switching operations for a current flow in the one direction of the DC-DC converter. The terms "(primary)" and "(secondary)" that are between parentheses refer to the corresponding switching operations for the reverse current flow in the other direction of the DC-DC converter. This method also allows a fast reversal of the power flow as well as a balanced current distribution in the three phases.

FIG. 6 shows the simulated curves of (a) the phase angle in degrees, (b) the phase current in amperes, and (c) the direct current in amperes, for a three-phase DC-DC converter shown in FIG. 1, which is operated with the switching method according to the invention as shown in FIG. 5 in order to quickly change the phase angle and in order to avoid oscillations in the direct current. By means of the above-mentioned alternative switching method according to the invention shown in FIG. 5, the phase current already reaches its target value after T/2, and the direct current in FIG. 6(c) likewise does not show any of the oscillations which can be seen with a switching method according to the state of the art shown in FIG. 2(c). During the switching operation from the phase angle $\phi1$ to $\phi2$, however, in contrast to the method according to the invention shown in FIG. 3, the phase current is not elevated, even if the plus/minus sign of the phase angle is changed; in this context, see the points in time (switching points) in FIGS. 6(a) and 9(b) that correspond to those in FIG. 4(b). As was the case with the method shown in FIG. 3, here, too, a low-pass filter, for instance, a $1^{st}$ order low-pass filter with Ts=1/6 ms, on the primary side and secondary side of the DC-DC converter, can filter the direct current of the appertaining sides even further. By the same token, one or more capacitors can be arranged on the primary side and/or on the secondary side for smoothing purposes.

In another embodiment, the methods, as shown in FIGS. 3 and 5, can effectuate a switching operation which, for purposes of setting the second phase angle $\phi2$, comprises one or more periods T of the primary and secondary alternating voltages 111, 112, 113, 211, 212, 213, and in which the phase angle $\phi$ between the primary and secondary alternating voltages 111, 112, 113, 211, 212, 213 is set stepwise to the second phase angle $\phi2$ on the edge. In this context, the stepwise setting of the phase angle $\phi2$ can be done linearly in steps of the same size. Moreover, the phase angle $\phi$ of the rising and falling edges can be adapted during the switching operation on the basis of the above-mentioned phase angles in order to compensate for transformer and switch influences. Moreover, the DC-DC converter G, G3 can be operated in such a way that the phase shifts of the primary alternating voltages 111, 112, 113 of the primary voltage bridges 11, 12, 13 among each other as well as the phase shifts of the secondary alternating voltages 211, 212, 213 of the secondary voltage bridges 21, 22, 23 among each other deviate from 120°.

Figure 7:
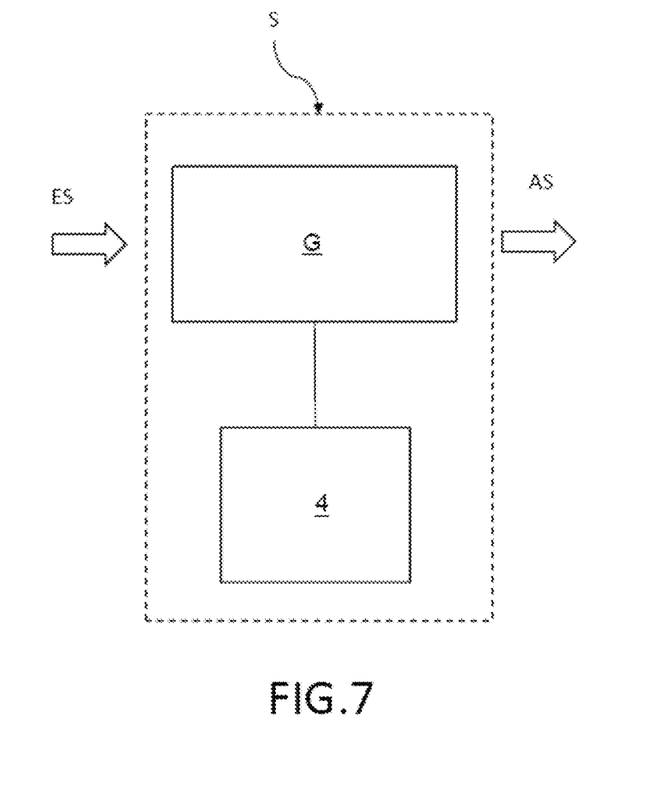
FIG. 7: a system consisting of a DC-DC converter and a control unit according to the present invention.

FIG. 7 shows a system S according to the invention consisting of the DC-DC converter G and the control unit 4, whereby the control unit 4 is configured to carry out the control of the active switches S1, S2 of the primary and secondary voltage bridges 11, 12, 13, 21, 22, 23 of the at least three-phase DC-DC converter G by means of the method according to the invention, as shown by way of an example in FIGS. 3 and 5 for a three-phase DC-DC converter. In one embodiment of the systems, the DC-DC converter G is a three-phase DC-DC converter with three actively switched primary voltage bridges 11, 12, 13, each having two or more active switches S1, and three actively switched secondary voltage bridges 21, 22, 23, each having two or more active switches S2. In another embodiment, depending on the selection made by the person skilled in the art, the control unit 4 can be configured as a control means 4 that makes use of one or more DSPs (digital signal processors), FPGAs (so-called field programmable gate arrays), CLPDs (so-called complex programmable logic devices), a microcontroller, or else employing a combination of the above-mentioned components.

The detailed presentation of the invention in this section and in the figures is given by way of an example of conceivable embodiments within the scope of the invention and consequently should not be construed in a limiting manner. In particular, the quantities indicated should be adapted by the person skilled in the art to the specific operating conditions of the rectifier (current, voltage). For this reason, all of the quantities indicated should only be construed as examples of specific embodiments.

Alternative embodiments that might be considered by the person skilled in the art within the scope of the present invention are likewise encompassed by the scope of protection of the present invention. In the claims, terms such "one" also include the plural. The reference numerals given in the claims should not be construed in a limiting manner.

LIST OF REFERENCE NUMERALS

G DC-DC converter (DAB DC-DC converter)
G3 three-phase DC-DC converter (DAB DC-DC converter)
1 primary side
10 primary capacitors
11 first primary voltage bridge
12 second primary voltage bridge
13 third primary voltage bridge
111 first primary alternating voltage
112 second primary alternating voltage
113 third primary alternating voltage
1$s$1, 1$s$2, 1$s$3 first switching operation of the primary voltage bridges 11, 12, 13
2$s$1, 2$s$2, 2$s$3 second switching operation of the primary voltage bridges 11, 12, 13
S1 switch of the primary voltage bridges
ES input voltage for DC-DC voltage converter
2 secondary side
20 secondary capacitors
21 first secondary voltage bridge
22 second secondary voltage bridge
23 third secondary voltage bridge
211 first secondary alternating voltage
212 second secondary alternating voltage
213 third secondary alternating voltage
1$n$1, 1$n$2, 1$n$3 first switching operation of the secondary voltage bridges 21, 22, 23
2$n$1, 2$n$2, 2$n$3 second switching operation of the secondary voltage bridges 21, 22, 23
S2 switch of the secondary voltage bridges
AS output voltage for the DC-DC converter
3 transformer, three-phase transformer
4 control unit (control means) of the switches
$\phi$ phase angle
$\phi$1 first phase angle
$\phi$2 second phase angle
T period of the alternating voltage
t0 starting point in time of the switching operation
PC phase current
DC direct current at the input side
S system of DC-DC converter and control unit V1, V2, V3 voltage in the first, second and third phases

The invention claimed is:

1. A method for operating an at least three-phase DC-DC converter having a primary side comprising at least three actively switched primary voltage bridges with several active switches for converting a DC input voltage into primary alternating voltages for each of the primary voltage bridges, and having a secondary side comprising at least three actively switched secondary voltage bridges with several active switches for converting secondary alternating voltages into a shared DC output voltage for each of the secondary voltage bridges, the primary and secondary voltage bridges each generating a phase, whereby each of the primary voltage bridges is coupled to one of the secondary voltage bridges via a multi-phase transformer, or via a plurality of particular transformers, one for each phase, whereby at least three primary alternating voltages as well as at least three secondary alternating voltages are each shifted, between the primary and second sides, by a phase angle ($\phi$) with a wave period (T), said method comprising:
for each phase generated by each of the primary and secondary voltage bridges, setting the phase angle ($\phi$) from a first phase angle value ($\phi$1) to a second phase angle value ($\phi$2) as a switching operation for transferring power from the primary side to the secondary side, whereby the primary and secondary voltage bridges are switched during the switching operation such that each phase angle ($\phi$) of each phase generated by each of the primary and secondary voltage bridges is set, during the switching operation, time-independently of each phase angle of each other phase generated by each of the primary and secondary voltage bridges.

2. The method according to claim 1, wherein each phase angle ($\phi$) of each phase generated by each of the primary and secondary voltage bridges is set during the switching operation, independently of falling or rising edges of the primary or secondary alternating voltages.

3. The method according to claim 1, wherein based on imbalances on the multi-phase transformer or the particular transformers for each phase, each phase angle ($\phi$) of each phase generated by each of the primary and secondary voltage bridges is set differently from each other phase angle of each phase generated by each of the primary and secondary voltage bridges to balance currents in each of the individual phases.

4. The method according to claim 1, wherein the at least three-phase DC-DC converter is a three-phase DC-DC converter with exactly three actively switched primary voltage bridges, each having two or more active switches, and exactly three actively switched secondary voltage bridges, each having two or more active switches, whereby the switching operation executes a setting for the second phase angle value ($\phi$2) of all three phases at same edges of the primary and secondary alternating voltages at the primary and secondary voltage bridges.

5. The method according to claim 4, further comprising:
a first switching of a first one of the primary alternating voltages of a second one of the primary voltage bridges at a first point in time (t0), and a first switching of a first one of the secondary alternating voltages of a second one of the secondary voltage bridges, shifted by the second phase angle value ($\phi$2),
a first switching of a second one of the primary alternating voltages of a first one of the primary voltage bridges at a second point in time, the second point in time being one-sixth of a wave period after the first point in time, and a first switching of a second one of the secondary alternating voltages of a first one of the secondary voltage bridges, shifted by the first phase angle value (ϕ1), a first switching of a third one of the primary alternating voltages of a third one of the primary voltage bridges at a third point in time, the third point in time being one-third of a wave period after the first point in time, and a first switching of a third one of the secondary alternating voltages of a third one of the secondary voltage bridges, shifted by the second phase angle value (ϕ2), a second switching of the first one of the primary alternating voltages of the second one of the primary voltage bridges at a fourth point in time, the fourth point in time being one-half of a wave period after the first point in time, and a second switching of the first one of the secondary alternating voltages of the second one of the secondary voltage bridges, shifted by the second phase angle value (ϕ2), a second switching of the second one of the primary alternating voltages of the first one of the primary voltage bridges at a fifth point in time, the fifth point in time being two-thirds of wave period after the first point in time, and a second switching of the second one of the secondary alternating voltages of the first one of the secondary voltage bridges, shifted by the second phase angle value (ϕ2), a second switching of the third one of the primary alternating voltages of the third one of the primary voltage bridges at a sixth point in time, the sixth point in time being five-sixths of a wave period after the first point in time, and a second switching of the third one of the secondary alternating voltages of the third one of the secondary voltage bridges, shifted by the second phase angle value (ϕ2).

6. The method according to claim 1, wherein each phase angle (ϕ) of each phase generated by each of the primary and secondary voltage bridges is different for rising and falling edges.

7. The method according to claim 6, wherein the at least three-phase DC-DC converter is a three-phase DC-DC converter with exactly three actively switched primary voltage bridges, each having two or more active switches, and exactly three actively switched secondary voltage bridges, each having two or more active switches, whereby the switching operation comprises three successive switching operations of the primary and secondary alternating voltages of the primary and secondary voltage bridges of each of three particular phases by a switching phase angle that is equal to half the sum of the first phase angle value (ϕ1) and the second phase angle value (ϕ2).

8. The method according to claim 7, further comprising:

a first switching of a first one of the primary alternating voltages of a second one of the primary voltage bridges at a first point in time (t0), and a first switching of a first one of the secondary alternating voltages of a second one of the secondary voltage bridges, shifted by the switching phase angle, a first switching of a second one of the primary alternating voltages of a first one of the primary voltage bridges at a second point in time, the second point in time being one-sixth of a wave period after the first point in time, and a first switching of a second one of the secondary alternating voltages of a first one of the secondary voltage bridges, shifted by the switching phase angle, a first switching of a third one of the primary alternating voltages of a third one of the primary voltage bridges at a third point in time, the third point in time being one-third of a wave period after the first point in time, and a first switching of a third one of the secondary alternating voltages of a third one of the secondary voltage bridges, shifted by the switching phase angle, repeating the switchings as a second switching of the first, second, and third ones of the primary alternating voltages and as a second switching of the first, second, and third ones of the secondary alternating voltages of the first, second and third ones of the primary voltage bridges, shifted by the second phase angle value (ϕ2).

9. The method according to claim 1, each of the alternating voltages having rising and falling edges, wherein the switching operation comprises one or more wave periods (T) of the primary and secondary alternating voltages, and the phase angle (ϕ) between the primary and secondary alternating voltages is set stepwise to the second phase angle value (ϕ2) on the rising or falling edges.

10. The method according to claim 9, wherein the stepwise setting of the second phase angle value (ϕ2) is done linearly in steps of equal size.

11. The method according to claim 1, each of the alternating voltages having rising and falling edges, wherein each phase angle value (ϕ) of the rising and falling edges is adapted during the switching operation based on the phase angle to compensate for transformer and switch influences.

12. The method according to claim 1, wherein the DC-DC converter is operated in such a way that the primary alternating voltages of the primary voltage bridges as well as the secondary alternating voltages of the secondary voltage bridges are shifted by a phase angle (ϕ) of 120° among each other.

13. The method according to claim 4, further comprising:

a first switching of a first one of the secondary alternating voltages of a second one of the secondary voltage bridges at a first point in time (t0), and a first switching of a first one of the primary alternating voltages of the second one of the primary voltage bridges, shifted by the second phase angle value (ϕ2), a first switching of a second one of the secondary alternating voltages of a first one of the secondary voltage bridges at a second point in time, the second point in time being one-sixth of a wave period after the first point in time, and a first switching of a second one of the primary alternating voltages of a first one of the primary voltage bridges, shifted by the first phase angle value (ϕ1), a first switching of a third one of the secondary alternating voltages of a third one of the secondary voltage bridges at a third point in time, the third point in time being one-third of a wave period after the first point in time, and a first switching of a third one of the primary alternating voltages of a third one of the primary voltage bridges, shifted by the second phase angle value (ϕ2), a second switching of the first one of the secondary alternating voltages of the second one of the secondary voltage bridges at a fourth point in time, the fourth point in time being one-half of a wave period after the first point in time, and a second switching of the first one of the primary alternating voltages of the second one of the primary voltage bridges, shifted by the second phase angle value (ϕ2), a second switching of the second one of the secondary alternating voltages of the first one of the secondary voltage bridges at a fifth point in time, the fifth point in time being two-thirds of wave period after the first point in time, and a second switching of the second one of the primary alternating voltages of the first one of the primary voltage bridges, shifted by the second phase angle value ($\phi 2$), a second switching of the third one of the secondary alternating voltages of the third one of the secondary voltage bridges at a sixth point in time, the sixth point in time being five-sixths of a wave period after the first point in time, and a second switching of the third one of the primary alternating voltages of the third one of the primary voltage bridges, shifted by the second phase angle value ($\phi 2$).

14. The method according to claim 7, further comprising:
a first switching of a first one of the secondary alternating voltages of a second one of the secondary voltage bridges at a first point in time (t0), and a first switching of a first one of the primary alternating voltages of a second one of the primary voltage bridges, shifted by the switching phase angle,
a first switching of a second one of the secondary alternating voltages of a first one of the secondary voltage bridges at a second point in time, the second point in time being one-sixth of a wave period after the first point in time, and a first switching of a second one of the primary alternating voltages of a first one of the primary voltage bridges, shifted by the switching phase angle,
a first switching of a third one of the secondary alternating voltages of a third one of the secondary voltage bridges at a third point in time, the third point in time being one-third of a wave period after the first point in time, and a first switching of a third one of the primary alternating voltages of a third one of the primary voltage bridges, shifted by the switching phase angle,
repeating the switchings as a second switching of the first, second, and third ones of the secondary alternating voltages and as a second switching of the first, second, and third ones of the primary alternating voltages of the first, second and third ones of the secondary voltage bridges, shifted by the second phase angle value ($\phi 2$).

15. A system consisting of an at least three-phase DC-DC converter having a primary side comprising at least three actively switched primary voltage bridges with several active switches for converting a DC input voltage into primary alternating voltages for each of the primary voltage bridges, and having a secondary side comprising at least three actively switched secondary voltage bridges with several active switches for converting the secondary alternating voltages into a shared DC output voltage for each of the secondary voltage bridges, whereby each of the primary voltage bridges is coupled to one of the secondary voltage bridges via a multi-phase transformer, or via a plurality of particular transformers, one for each phase, whereby at least three primary alternating voltages of the primary voltage bridges as well as at least three secondary alternating voltages of the secondary voltage bridges are each shifted, between the primary and second sides, by a phase angle ($\phi$) with a wave period (T), said system comprising:
at least one control unit configured to carry out control of the active switches of the primary and secondary voltage bridges of the at least three-phase DC-DC converter by setting, for each phase generated by each of the primary and secondary voltage bridges, the phase angle ($\phi$) from a first phase angle value ($\phi 1$) to a second phase angle value ($\phi 2$) as a switching operation for transferring power from the primary side to the secondary side, whereby the primary and secondary voltage bridges are switched during the switching operation such that the phase angle ($\phi$) of each individual phase generated by each voltage bridge is set time-independently of the phase angle of each other phase during the switching operation.

16. The system according to claim 15, wherein the at least three-phase DC-DC converter is a three-phase DC-DC converter with exactly three actively switched primary voltage bridges, each having two or more active switches, and exactly three actively switched secondary voltage bridges, each having two or more switches.

* * * * *